Aug. 19, 1930.                G. C. RENSINK                1,773,600
              AIR CLEANER FOR INTERNAL COMBUSTION ENGINES
                    Filed Sept. 13, 1928        2 Sheets-Sheet 1
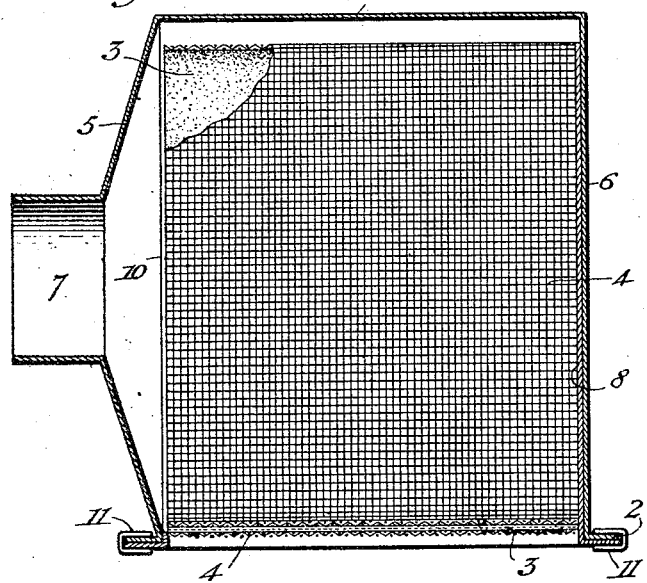
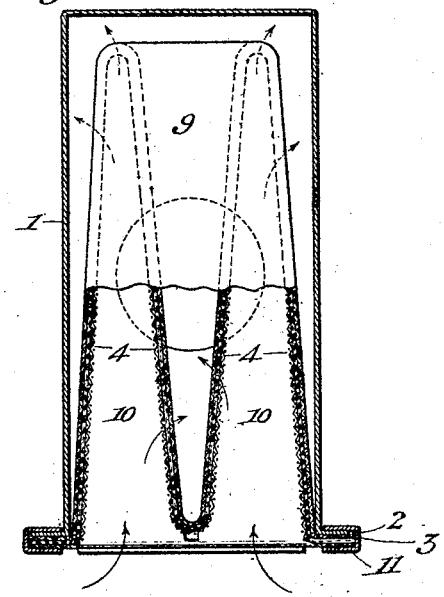
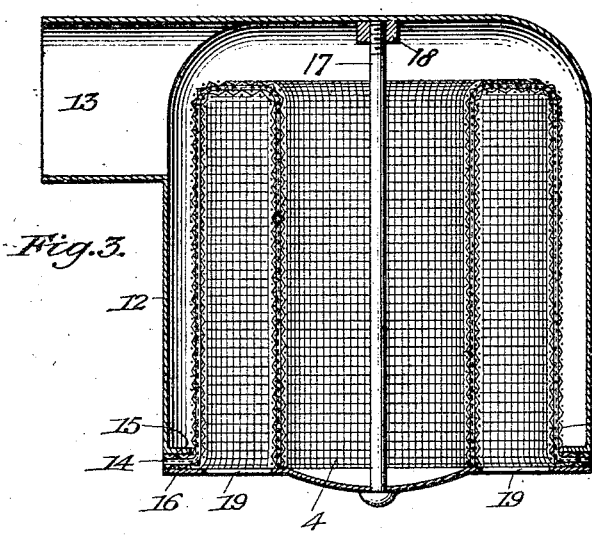
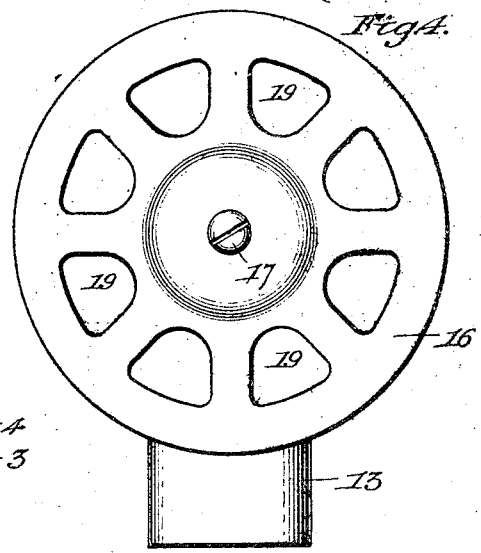
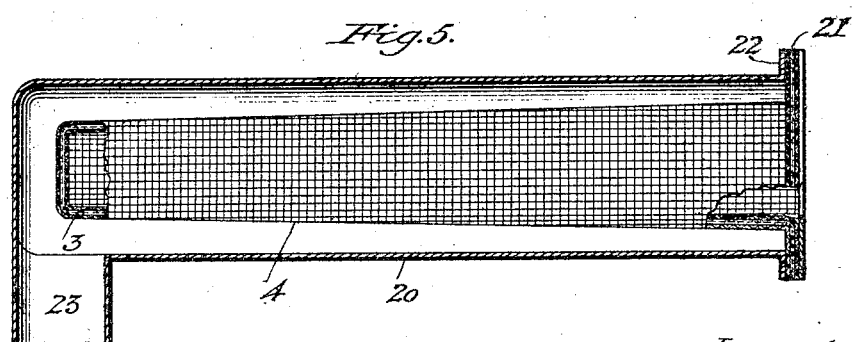
Inventor:
George C. Rensink,
By H. S. Bailey Attorney.

Aug. 19, 1930.  G. C. RENSINK  1,773,600
AIR CLEANER FOR INTERNAL COMBUSTION ENGINES
Filed Sept. 13, 1928  2 Sheets-Sheet 2
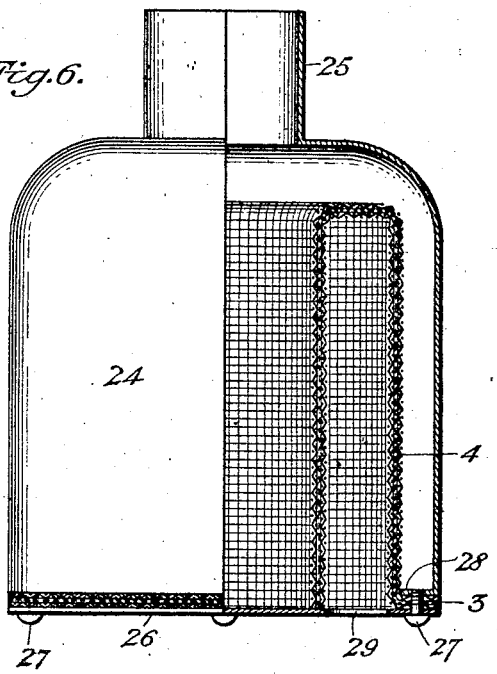
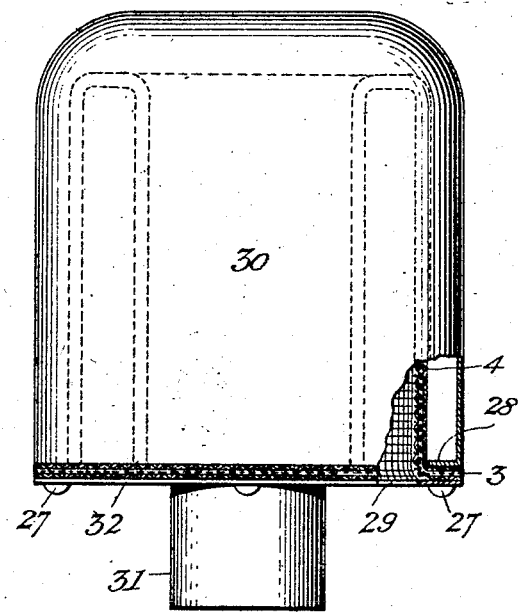
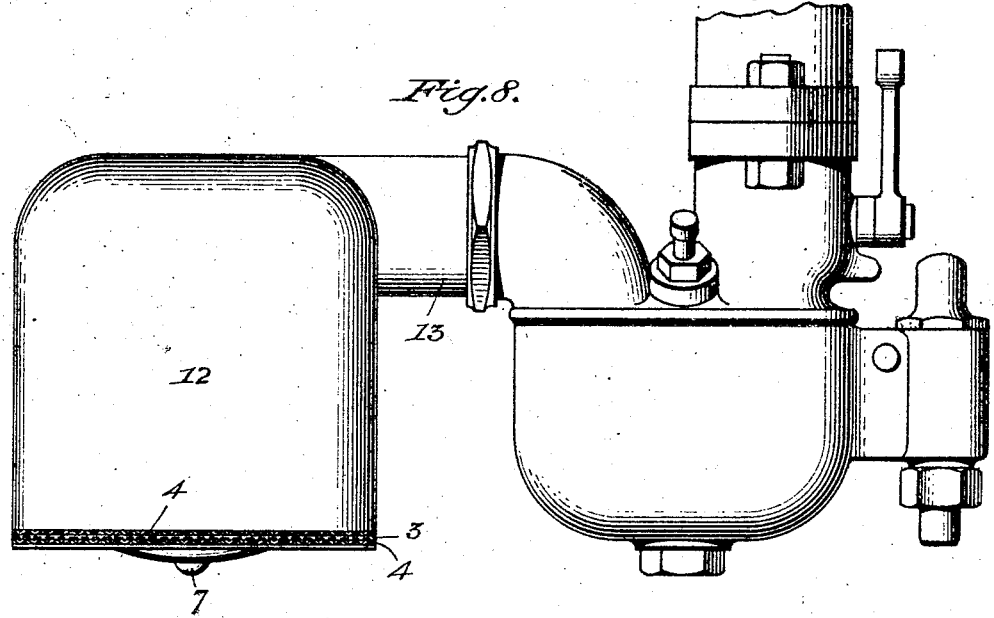
Inventor:
George C. Rensink.
By H. S. Bailey Attorney.

Patented Aug. 19, 1930

1,773,600

UNITED STATES PATENT OFFICE

GEORGE C. RENSINK, OF DENVER, COLORADO

AIR CLEANER FOR INTERNAL-COMBUSTION ENGINES

Application filed September 13, 1928. Serial No. 305,799.

My invention is for a straight air current entering and positive dust eliminating air cleaner for automobile trucks, tractors and other gasoline-using vehicles, and for other purposes.

And the objects of my invention are:

First: To provide an air cleaner that can be attached to any automobile, truck, tractor or any other kind of a gasoline operated vehicle in use or in the course of manufacture.

Second: To provide an air cleaner for automobiles and other gasoline operated vehicles into which the air flows in a straight path and upon entering it flows through a filtering medium in a straight uncontracted path into an air chamber, from which it flows positively free from even the very finest dust to the carburetor.

Third: To provide an air cleaner that is arranged to cause the dust and the grit and the sand in the air that is sucked into it to pack itself onto the filtering surfaces of the cleaner in positions to automatically discharge itself from the cleaner by the slight vibratory jolting of the automobile on an even ground, or from any vibratory impulse such as knocking against it occasionally with the knuckles of the hand of an operator.

Fourth: To provide an air cleaner that is simple in construction, inexpensive to manufacture and to attach to the carburetors of automobiles, trucks and other gasoline operated vehicles and to be removed therefrom when necessary. And that also can be used in manufacturing plants where atmospheric air is needed that is free from dust.

I attain these objects by the mechanism illustrated in the accompanying drawings in which:

Figure 1—is a vertical sectional view of a rectangular form of the improved air cleaner.

Figure 2—is a transverse sectional view thereof.

Figure 3—is a vertical sectional view of a cylindrical form of the air cleaner.

Figure 4—is a bottom view thereof.

Figure 5—is a longitudinal sectional view of a tubular form of the air cleaner.

Figure 6—is a side view partly in section showing a cylindrical form of the air cleaner, having an outlet at the top thereof.

Figure 7—is a side view of a similar air cleaner having the outlet at the bottom thereof.

Figure 8—is a side view illustrating the application of the form of air cleaner shown in Figure 3 to a carburetor.

Similar letters of reference refer to similar parts throughout the several views.

Referring to the drawings the numeral 1 designates the casing of my straight air current entering and positive dust eliminating air cleaner.

The casing 1 is preferably made of a rectangular shape, but it may be made of a circular, or of any other practical shape; its bottom end is made open to receive the air cleaning and dust separating materials.

The bottom edge portions of the ends and sides of the casing are formed with right angled flanges 2 to which are clamped the terminal ends of the air and dust separating and the air filtering medium in a manner to be presently described.

I preferably use as a filtering medium for the air to pass through, a sheet of filtering paper 3 and on opposite sides of it I place a screen 4 of preferable one eighth of an inch mesh made of brass or other non-rusting wire, and the sheet or layer of the fibering material is folded in between the screens and the three are pressed tightly together and are cut of a width to fit snugly but removably into the casing, and they are bent into the form of the letter M, with their upper apexes rounded into short curves and their bottom central portion similarly rounded, the two side edge portions of the screen element being bent outward at right angles, so as to rest against the flange 2 of the casing when the said screen element is inserted therein. The casing of the character of cleaner shown in Figures 1 and 2 is rectangular in form, the sides thereof being preferably about twice the width of the ends, and the casing is open at the bottom. One end 5 of the casing is bulged out, as shown, but the opposite end 6 is flat, and the end 5 is provided with a neck 7 which is adapted to be slipped over or into the air inlet member of a carburetor. In cross sectional outline the screen element is bent substantially in the form of the letter M, and one end thereof, is entirely covered by a metal end plate 8, which is soldered thereto, but at the opposite end, the middle V-portion 9 is left open or uncovered, while the two adjoining inverted V-portions are covered by end plates 10 which are soldered thereto. The bottom edge portions of the end plates 8 and 10 are bent at right angles to rest against the under side of the flange 2 of the casing and the bottom edge portions of the side members of the screen element are also bent at right angles to rest against the said flange and these bent portions are secured to the flanges 2 in any suitable manner, but preferably by means of channel clips 11 which are slipped over the parts and thus clamp the bent ends of the screen element to the flange 2. By this arrangement when the device is attached to a carburetor, the air, under the suction action of the engine pistons, is drawn into the inverted V portions of the screen and passes through the sides thereof as indicated by the arrows in Fig. 2; the air passing through the inner sides entering the open V-shaped space 9 and passing directly to the carbureter through the neck 7, while the air passing through the outer sides enters the space between the said sides and the sides of the casing and passes to the neck 7 through the space afforded by the bulged end 5 of the casing. All foreign substances in the air, even the very finest dust, is caught and retained by the filter paper 3, so that the air passing into the carburetor, and thus to the engine cylinders is thoroughly cleansed. All sides of the screen element are inclined as shown in Fig. 2, so that they will free themselves of grit and dust under the vibratory action imparted by the car when in motion, or when the screen is manually knocked upon.

In Figure 3 and 4 is shown a modification of the air cleaner in which a cylindrical casing 12 is provided which is open at the bottom end and a neck 13 extends at right angles from the upper end thereof for attachment to a carbureter. In this arrangement I employ the same character of screen element as previously described, the element being first bent over into either U or V-shaped form and then into circular form, the free ends being soldered together. The outer or marginal edge portion of the element is then pressed or bent outward at right angles as shown at 14, and when the element is inserted in the casing, the right angled portion rests against an inturned flange 15 formed on the bottom edge of the casing. The screen is held in place by a plate or disk 16 through the center of which a screw 17 is passed and is screwed into a nut 18, which is soldered to the top of the casing, thus clamping the bent edge of the screen element between the said plate 16 and the flange 15 of the casing. The screen element provides an inner and outer circular screen wall, and the plate 16 is provided with air inlet openings 19, which permits air to be drawn into the space between the inner and outer screen walls, while the portion of the plate covering the lower end of the inner circular wall is solid or without openings and is also outwardly convexed so as to withstand the pressure of the head of the screw 17 which bears upon it. The air is drawn through the openings 19 and into the space between the inner and outer screen walls; thence through the walls to the interior of the inner wall and to the space between the outer wall and the casing and passes through the neck 13 to the carburetor.

In Fig. 5 is shown a tubular form of air cleaner, and in this form the tubular casing 20 is of sufficient length to accommodate a screen element having an ample screen surface. The screen element is the same as that above described and is in the form of a slightly tapered tube which is closed at its inner end, its other end being bent into an outwardly extending flange 21, which rests against a corresponding flange 22 on the end of the casing, and is screwed thereto in any suitable manner. The opposite end of the casing is provided with an outlet neck 23 for attachment to a carburetor.

In Fig. 6 is shown a cleaner 24, similar in form to that shown in Fig. 3, but the outlet neck 25 extends from the top of the casing, the screw 17 is dispensed with and the screen element is held within the casing by a plate 26 and screws 27 which pass through the plate, the flange end of the screen element and through an inturned flange 28 on the end of the casing. The plate 26 is provided with openings 29 the same as in the plate 16, which admit air to the space between the inner and outer screen walls.

In Fig. 7 is shown a cleaner 30, similar to that shown in Fig. 6, the only difference being that the outlet neck 31 is at the bottom of the casing and is formed on the plate 32 which covers the lower end of the casing and is secured thereto in the same manner as the plate 26.

The various arrangements of the cleaner permits their use with carbureters having either vertical or horizontal inlets, and in cases where the position of the carbureter would permit the use of one form of cleaner while another form could not be used; and while the necks are shown as being short and straight, it is the intention to make the necks as long as may be required and curved in any direction when necessary for proper attachment to a carbureter.

Having described my invention, what I claim as new and desire to secure by Letters Patent, is:—

1. In an air cleaner; the combination of a casing having an open dust laden air receiving aperture and an open filtered air discharging member, of a filtering member extending into said casing from its air receiving aperture, and removably secured thereto; said filtering medium comprising a sheet of filtering paper enfolded and supported rigidly by screen members of any predetermined mesh, and adapted to clamp the filtering paper tightly between them, said filtering medium being arranged within said casing in wide surfaced plate members that are bent in short curves at their ends to form continuing wide plate surfaces along side of each other, said wide surfaced plates being placed within said casing at a space apart at the open end of said casing that will allow air to flow between them and be sucked through said filtering paper and a plate secured to the opposite edges of said plates that fits closely but removably up against the opposite sides of said casing, said casing being provided with a space at the top and opposite sides of said filtering plates into which the filtered air flows from said filtering plates and from which it flows into the carbureter.

2. In an air cleaner of the character described, the combination with a casing having an air inlet at one end and an air outlet, of a screen element in said casing folded to present inner and outer screen walls which are separated by an air receiving space communicating with said air inlet, spaces being provided between said inner screen walls and between the outer screen walls and the wall of the casing which communicate with said outlet, a flange on the inlet end of said casing, a flange on the end of said screen element which engages said casing flange, a plate which covers said inlet and means for clamping said plate and said flanges together, said plate having inlet openings coinciding with the space between the inner and outer screen walls.

3. In an air cleaner of the character described, the combination with a cylindrical casing having an open flanged end and an outlet; of a screen element comprising a sheet of air filtering material, faced on either side by a wire screen, said element being folded in an annular U-shaped form and bent to present inner and outer cylindrical spaced walls, the outer wall being flanged to bear upon the flange of the casing, a circular plate over the flanged end of the screen element, a screw which is passed through said plate, and is screwed into a threaded nut secured to the upper end of the casing thereby clamping the screen flange against the casing flange, said plate having openings coincident with the space between the inner and outer screen walls, the space surrounded by said inner screen walls communicating with a space surrounding the outer screen wall and which communicates with said outlet.

4. In an air cleaner of the character described, the combination with a cylindrical casing having an open flanged end, of a screen element in said casing comprising a sheet of air filtering material faced on either side by a wire screen, said element being first folded into U-shaped form and then bent to present inner and outer cylindrical walls, a space being left between the outer wall and casing, said outer wall being flanged to engage the casing flange a plate over the screen flanges having inlet openings, communicating with the space between the inner and outer screen walls, means for clamping said screen flange, said casing flange and said plate together, said casing having an air outlet.

In testimony whereof, I affix my signature.

GEORGE C. RENSINK.